(12) United States Patent
Vainio et al.

(10) Patent No.: US 7,751,856 B2
(45) Date of Patent: Jul. 6, 2010

(54) COORDINATION OF APPARATUS AND MOBILE TERMINAL MEDIA PROCESSING CIRCUITRY

(75) Inventors: Marko Vainio, Oulu (FI); Tino Hellberg, Littoinen (FI)

(73) Assignee: Nokia Corporation, Espoo (FI)

( * ) Notice: Subject to any disclaimer, the term of this patent is extended or adjusted under 35 U.S.C. 154(b) by 225 days.

(21) Appl. No.: 10/577,453

(22) PCT Filed: Mar. 31, 2004

(86) PCT No.: PCT/IB2004/000969

§ 371 (c)(1), (2), (4) Date: Apr. 27, 2006

(87) PCT Pub. No.: WO2005/041548

PCT Pub. Date: May 6, 2006

(65) Prior Publication Data

US 2007/0082605 A1    Apr. 12, 2007

(30) Foreign Application Priority Data

Oct. 28, 2003    (WO) .................. PCT/IB03/04771

(51) Int. Cl.
H04B 1/38    (2006.01)
(52) U.S. Cl. .................. 455/570; 370/278; 370/286
(58) Field of Classification Search .................. 455/209; 370/286; 348/14.01–14.14
See application file for complete search history.

(56) References Cited

U.S. PATENT DOCUMENTS

| | | | |
|---|---|---|---|
| 5,349,698 A | 9/1994 | Maru | |
| 6,097,943 A | 8/2000 | Nordwall | |
| 6,201,975 B1 * | 3/2001 | Isberg et al. .................. | 455/557 |
| 6,742,061 B1 | 5/2004 | Hellberg | |
| 6,751,313 B2 * | 6/2004 | Zad Issa .................. | 379/406.01 |
| 2002/0090982 A1 | 7/2002 | Hollstrom et al. | |
| 2002/0102998 A1 | 8/2002 | Lin | |
| 2002/0186845 A1 * | 12/2002 | Dutta et al. .................. | 380/247 |
| 2003/0156097 A1 * | 8/2003 | Kakihara et al. ............ | 345/156 |
| 2003/0195010 A1 * | 10/2003 | Pattabiraman et al. ...... | 455/517 |
| 2005/0014531 A1 * | 1/2005 | Findikli ...................... | 455/557 |

FOREIGN PATENT DOCUMENTS

EP    0 833 455 A2    4/1998

(Continued)

OTHER PUBLICATIONS

Proakis et al: "Digital Signal Processing", Prentice Hall International, 1996, ISBN 0133943389, pp. 502-519.

*Primary Examiner*—Rafael Pérez-Gutiérrez
*Assistant Examiner*—Marcos Batista
(74) *Attorney, Agent, or Firm*—Banner & Witcoff Ltd.

(57) ABSTRACT

An accessory device for a mobile telecommunications terminal is disclosed, wherein the mobile telecommunications terminal comprises means for media processing and means for connecting to the accessory device. The accessory device comprises circuitry adapted to provide media transferring capabilities, a memory comprising at least one pre-stored parameter value related to the media processing capabilities of the mobile telecommunications terminal and for use by the mobile telecommunications terminal, and transfer means for transferring the at least one parameter value from the memory in the accessory device to the mobile telecommunications terminal via the connecting means.

14 Claims, 7 Drawing Sheets

FOREIGN PATENT DOCUMENTS

| | | |
|---|---|---|
| EP | 1 257 001 A1 | 11/2002 |
| EP | 1 347 623 A | 9/2003 |
| WO | WO 98 00993 | 1/1998 |
| WO | WO 99 43136 | 8/1999 |
| WO | WO 00 74350 A | 12/2000 |
| WO | WO 02 102035 A | 12/2002 |
| WO | WO 03 077504 | 9/2003 |

\* cited by examiner

COORDINATION OF APPARATUS AND MOBILE TERMINAL MEDIA PROCESSING CIRCUITRY

This application is a National Stage application of co-pending PCT application PCT/IB2004/000969 filed Mar. 31, 2004, which was published in English under PCT Article 21(2) on May 6, 2005, which claims priority from PCT international application PCT/IB2003/04771 filed Oct. 28, 2003. These applications are incorporated herein by reference in their entirety.

TECHNICAL FIELD

The present invention generally relates to mobile telephone equipment, and more specifically to an accessory device for a mobile terminal, which device will affect the performance of the mobile terminal in respect of audio, video, or image processing capabilities provided by the mobile terminal when the accessory device is connected to the mobile terminal.

BACKGROUND

With the increasing usage of mobile telecommunications stations, such as mobile telephone terminals, by users in various situations and in various places, demands for additional functionality of the mobile terminals arise. Such a demand is e.g. the possibility to be able to place and receive telephone calls to or from other persons without being forced to use one or both hands for operating the mobile terminal. A well known solution to the problem of operating the mobile terminal station without using the hands is to use a hands-free unit which is connected to the telephone by means of contacts on the housing of the mobile terminal and the hands-free unit. The hands-free unit may be in form of a microphone and an earphone coupled to the mobile terminal by means of a thin flexible cable, or in form of a docking station in a car connecting the mobile terminal to a microphone and a loudspeaker when the telephone is placed in the docking station. In addition to the transducer elements the hands-free unit preferably comprises suitable electronic circuitry such as amplifiers and interface circuits. Moreover, the docking station is preferably adapted to interact with the selected parts of the electronics in the car so as to make it possible to e.g. mute a stereo in the car when a call is received.

Regardless of the specific design of the hands-free unit, it may be operated by means of the voice rather than by means of the hands of the user, wherein the user provides predetermined commands orally to the mobile terminal for instructing the mobile terminal to perform specific tasks. Exemplary commands for use with such a device may be "answer", "hang-up", "call home" etc.

Even though the hands-free facilitates the use of the mobile terminal station while e.g. traveling by car, the environment in which the mobile station is used may not be well suited for oral communication. For example, the noise level in a car varies according to various conditions, such as the vehicle's acceleration and deceleration, entry to and exits from tunnels, the positions of the windows in the car, the character of the road on which the car is traveling, weather conditions, passengers riding in the car, etc. Noise levels exceeding 80 dB inside a car when using the car under normal conditions are common in many cars today. Besides the increased noise level inside the car when the car is moving, the small compartment of the car gives rise to other undesirable acoustic effects, such as echoes and frequency distortion, impairing the intelligibility of a telephone call made from inside the car.

It is known in the art to reduce the impact of echoes generated inside the car by providing suitable electronic equipment which electronically cancels the echoes by means of filtering the signal received by the microphone in the hands-free unit. More specifically, the echo-canceling equipment is usually in form of a digital signal processor (DSP) and an associated echo-canceling software which is executed in the DSP for reducing the influence of the echoes in the signal from the microphone. The algorithm used for modeling the echoes arising from the small compartment inside the car requires the calculation of a large amount of parameter values which are unique for each compartment.

As can be understood, the accuracy of the calculated parameter values are crucial for the overall performance of the echo canceling equipment, i.e. the conditions under which the audio data, serving as a base for the calculation of the parameter values, are recorded will affect the final values of the parameters in the echo-canceling algorithm. In case the parameter values are based on a recording made while the car is moving, the sources of interference mentioned above (the vehicle's acceleration and deceleration etc) will deteriorate the end result of the parameter value calculation. Moreover, if the compartment is empty apart from the driver of the car, the echo characteristics will be different than if one or more passengers are present inside the car. It is hence of outmost importance that the conditions under which audio data is recorded for the calculation of the parameter values are adapted to the actual driving conditions and that the audio recording in a true manner reflects the design of the interior of the car.

As to the frequency distortion arising from the environment in which the mobile terminal is used, e.g. when using the mobile terminal together with a hands-free unit in a car, the discussion above applies as well. The DSP in the mobile terminal may then perform a frequency correcting algorithm (frequency equalization), wherein frequencies being attenuated by e.g. the car upholstery are amplified in order to provide a higher-quality sound reproduction. Also in this case, the algorithm used for compensating the poor frequency response of the small compartment of the car requires the calculation of filter parameter values which are unique for each compartment.

U.S. Pat. No. 6,097,943 discloses an accessory item for performing echo-canceling in a mobile radio subscriber station. The accessory item includes a separate memory within which parameter values calculated by the processor of the mobile station and related to performance of the echo-canceling are stored. The parameter values are retrieved by the same or a different mobile station on a subsequent occasion and used to perform the echo-canceling without having to recalculate the parameter values. The parameter values are calculated and stored in the memory of the accessory item on the first occasion when the accessory item is attached to the mobile subscriber station. As can be understood from the above, the invention according to U.S. Pat. No. 6,097,943 put great demands on both the user and the conditions under which the recording is made when he is performing the initial parameter value calculation. Firstly, the user must be provided with specific information regarding the operation of the accessory device, i.e. how the echo-canceling functionality is achieved, in order for being able to provide the correct acoustic conditions for the initial recording. Secondly, the user must take into consideration how to establish the correct acoustic conditions in the car, i.e. shall the car be moving or not, shall there be any passengers present in the compartment, shall the car be in a garage, etc.

Furthermore, the mobile subscriber station to which the accessory item is attached must be able to provide the necessary computational power in order to provide a quick and correct calculation of the parameter values. Besides providing the parameter values to the accessory unit for subsequent use, the DSP in the mobile subscriber station must also be able to process the audio data received from the accessory unit in order to provide the desired echo-canceling or frequency correcting functionality described above. Such data processing put even greater demands on the DSP in the mobile subscriber station as to the provision of computational power, wherein it may be more efficient under certain circumstances to shift the computational burden over to the accessory device. Moreover, as discussed above the environment in which the mobile terminal is used, e.g. a small compartment inside a car, requires the calculation of a large amount of parameter values which are unique for each compartment. Even though the mobile terminal may calculate the required parameter values and use them in one or more general echo-canceling routines, the widespread use of mobile terminals in many different environments, which are not known at the time of manufacture of the mobile terminals, implies that the routines used for providing the audio processing functionality are not optimized for one specific environment in which the mobile terminal may reside.

Finally, since increased computational power of the DSP in the mobile terminal gives rise to increased energy consumption in total and hence a short battery operating time, it is of outmost importance that the computational power of the DSP in the mobile terminal is kept as low as possible still providing the necessary audio, video or image processing functionality.

SUMMARY OF THE INVENTION

An object of the present invention is to overcome the above described problems of the known technologies in regard to providing the best possible parameter values for media processing as well as providing optimized media processing functionality in the mobile terminal/accessory device system without the use of a specialized mobile terminal. The present invention is based on the understanding that the parameter values obtained according to the prior art are not optimal due to sources of interference when initially establishing the parameter values. The present invention is also based on the understanding that under certain circumstances it is more efficient from a media processing point of view to provide the necessary media processing functionality inside the accessory device rather than in the mobile terminal.

Particular advantages of the present invention are optimal media processing quality, less demands for high processing capability in the mobile terminal, and easy to use for end users of the mobile terminal. A further advantage of the invention is higher flexibility in selecting the mobile terminal to use with the accessory device.

The above objects, advantages and features together with numerous other objects, advantages and features, which will become evident from the detailed description below, are obtained according to a first aspect of the present invention by an accessory device for a mobile telecommunications terminal, wherein the mobile telecommunications terminal comprises media processing circuitry adapted to provide media processing functionality in the mobile telecommunications terminal and means for coupling to the accessory device, the accessory device comprising:

media processing circuitry adapted to provide media processing functionality in the accessory device;

coupling means adapted to establish a communication link between the accessory device and the mobile telecommunications terminal; and accessory interface circuitry adapted to transfer a message to the mobile telecommunications terminal via the coupling means, said message comprising a specification of at least a part of the media processing functionality provided by the accessory device media processing circuitry.

The message received in the mobile terminal may hence comprise processing specifications related to a specific location in which the mobile terminal is residing, thereby providing higher-quality media processing by enabling the mobile terminal to disable the corresponding processing functions in the mobile terminal. The specified processing functionality may then be performed by the environment-specific accessory device.

The device according to the present invention may be adapted to provide a message comprising a command to the mobile communications terminal to disable the specified processing functionality in the media processing circuitry in the mobile telecommunications terminal. The device will hence take control of the specified processing functions, thereby avoiding unnecessary media processing in both the accessory device and the mobile terminal.

The device according to the present invention may be adapted to receive a request for a transfer of the message from the mobile telecommunications terminal before transferring the message to the mobile communications terminal. The mobile terminal may hence use the request for identifying the accessory device and its specific media processing capabilities in order to disable the corresponding functions inside the mobile terminal.

The device according to the present invention may comprise media transferring circuitry for transferring media data between the accessory device and the mobile telecommunications terminal, wherein the media transferring circuitry may be adapted to transfer audio data, video data or image data.

The device according to the present invention, wherein the media processing circuitry is adapted to perform an echo-canceling algorithm and/or a frequency equalizing algorithm.

The above objects, advantages and features together with numerous other objects, advantages and features, which will become evident from the detailed description below, are obtained according to a second aspect of the present invention by a method for providing media processing capabilities for a mobile telecommunications terminal, the method comprising the steps of:

coupling an accessory device with media processing capabilities to the mobile telecommunications terminal;

transferring a message from the accessory device to the mobile telecommunications terminal via said coupling, said message comprising a specification of at least a part of the media processing functionality provided by the accessory device.

In the method according to the invention the message may comprise a command to the mobile communications terminal to disable the specified processing functionality in the media processing circuitry in the mobile telecommunications terminal.

In the method according to the invention the accessory interface circuitry may receive a request, from the mobile telecommunications terminal, for a transfer of the message before transferring the message to the mobile communications terminal.

In the method according to the invention the accessory device may transfer media data which is processed in the accessory device in accordance with the specified processing functionality.

In the method according to the invention the transferred media may be audio data, video data or image data.

In the method according to the invention the media processing in the accessory device may comprise an echo-canceling algorithm or a frequency equalizing algorithm.

According to another aspect of the present invention an accessory device for a mobile telecommunications terminal is provided, wherein the mobile telecommunications terminal comprises means for media processing and means for connecting to the accessory device, the accessory device comprising:

circuitry adapted to provide media transferring capabilities;

a memory comprising at least one pre-stored parameter value related to the media processing capabilities of the mobile telecommunications terminal and for use by the mobile telecommunications terminal; and transfer means for transferring the at least one parameter value from the memory in the accessory device to the mobile telecommunications terminal via the connecting means.

The parameter values received in the mobile terminal may hence be optimized for a specific location, thereby providing higher-quality media processing.

The device according to the present invention may be adapted to provide audio, video, or still image transferring capabilities. The device will hence be suitable for any form of media processing application.

The device according to the present invention may comprise selections means for selecting and transferring at least one pre-stored parameter value from a set of pre-stored parameter values in the memory. A user may hence easily select the best suited parameter value which will provide the best performance of the media processing.

The device according to the present invention may comprise a controller which is adapted to select the at least one pre-stored parameter value from a set of pre-stored parameter values in the memory. The mobile terminal is hence automatically provided with the best suited parameter value without interaction from the user of the mobile terminal.

The device according to the present invention may provide parameter values for an echo-canceling algorithm or a frequency equalizing algorithm.

According to another aspect of the present invention, a method providing media processing capabilities for a mobile telecommunications terminal is provided, the method comprising the steps of:

connecting the mobile telecommunications terminal to an accessory device;

receiving in the mobile telecommunications terminal at least one pre-stored parameter value from a memory in the accessory device; and using the at least one pre-stored parameter value received in the mobile telecommunications terminal for performing media processing on media data in the mobile telecommunications terminal.

In the method according to the invention the media processing may be processing of audio data, video data, or still image data.

In the method according to the invention at least one pre-stored parameter value may be selected from a set of pre-stored parameter values in the memory of the accessory device by means of a switch, or a controller in the accessory device may automatically select the at least one pre-stored parameter value from a set of pre-stored parameter values.

In the method according to the invention, the media processing in the mobile telecommunications terminal may be an echo-canceling algorithm or a frequency equalizing algorithm.

BRIEF DESCRIPTION OF THE DRAWINGS

Further objects, features and advantages of the present invention will become apparent upon consideration of the following detailed description in conjunction with the appended drawings.

DETAILED DESCRIPTION OF THE INVENTION

A telecommunication system in which the present invention may be applied will first be described with reference to FIG. 1. Then, the particulars of the accessory device according to the invention will be described with reference to the remaining Figures.

Figure 1:
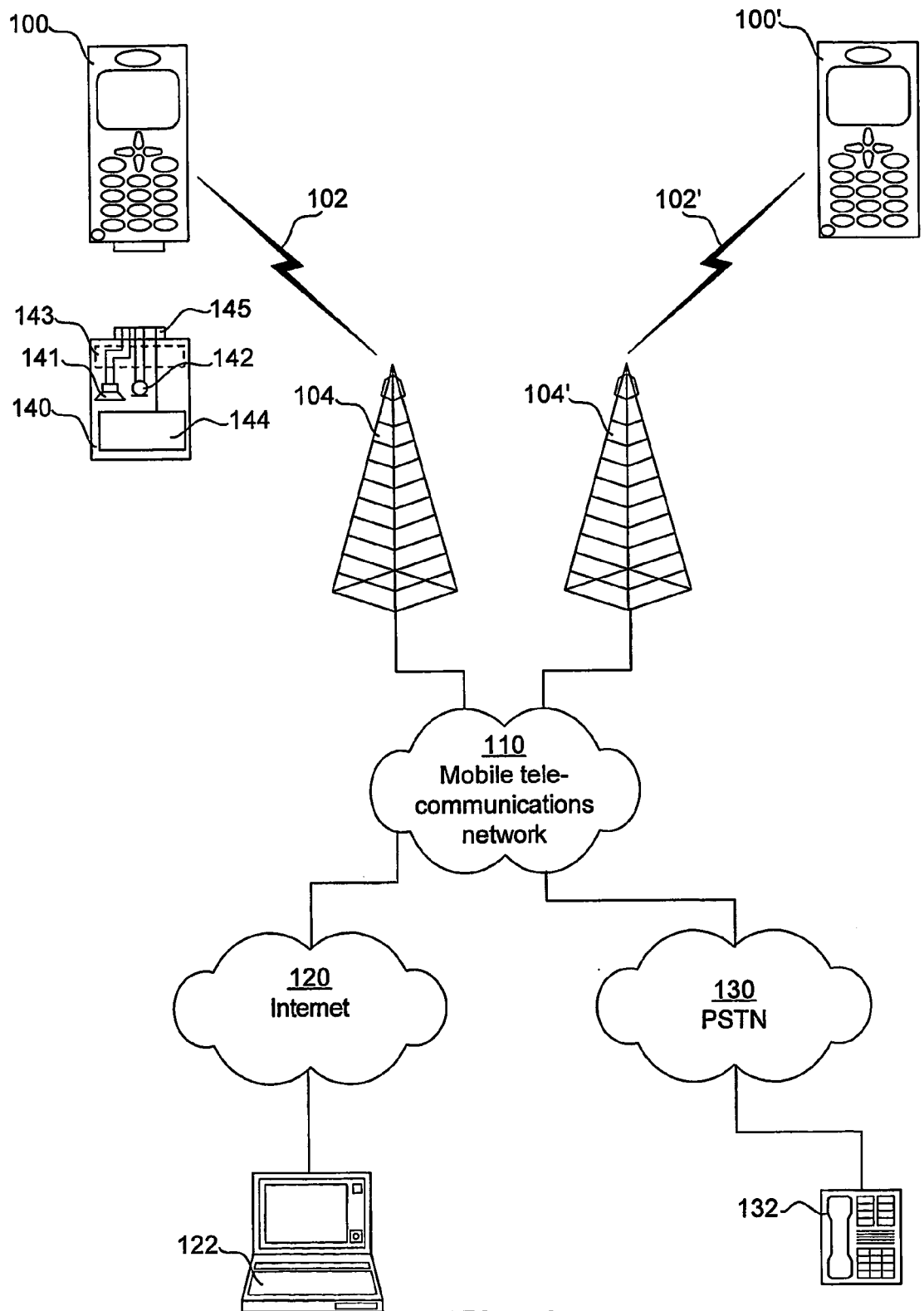
FIG. 1 is a schematic illustration of a telecommunication system, in which the present invention may be applied.

In the system of FIG. 1, audio, video, or still image data may be communicated between various units 100, 100', 122 and 132 by means of different networks 110, 120 and 130 (in most cases the public switched telephone network 130 is used for audio communication only). In the remainder of the text, the term "media" will be used as a generic term covering any form of audiovisual data. Hence, the media may represent speech, music, video sequences, movies, still images, or any other type of information which may be perceived by a person using his ears or his eyes. Hence, the media may be communicated from a user of a stationary telephone 132 through the public switched telephone network (PSTN) 130 and a mobile telecommunications network 110, via a base station 104 or 104' thereof across a wireless communication link 102 or 102' to a mobile terminal 100 or 100', and vice versa. The mobile terminals 100, 100' may be any commercially available devices for any known mobile telecommunications system, such as GSM, UMTS, D-AMPS or CDMA2000. Moreover, the system includes a computer 122 which is connected to a global data network 120 such as the Internet and is provided with software for IP (Internet Protocol) telephony.

Furthermore, the system of FIG. 1 also includes an accessory unit, in this case a hands-free unit 140, which may be connected to any one of the terminals 100, 100', 122 and 132. In the figure the hands-free unit 140 is connected to the mobile terminal 100 for exemplifying purposes only. As will be disclosed in more detail below, the hands-free unit 140 comprises a loudspeaker 141 for reproducing audio data to the user, a microphone 142 for receiving speech or any other audio information, transfer means 143 for adapting the signal levels of the audio data and thereafter transferring the audio data to the mobile terminal 100, a memory 144 for storing parameter values related to the processing of audio data received from the user by means of the microphone 142, and connecting means 145 for connecting the hands-free unit to the mobile terminal.

The system illustrated in FIG. 1 serves exemplifying purposes only, and thus various other situations where media is communicated between different units are possible within the scope of the invention.

Figure 2:
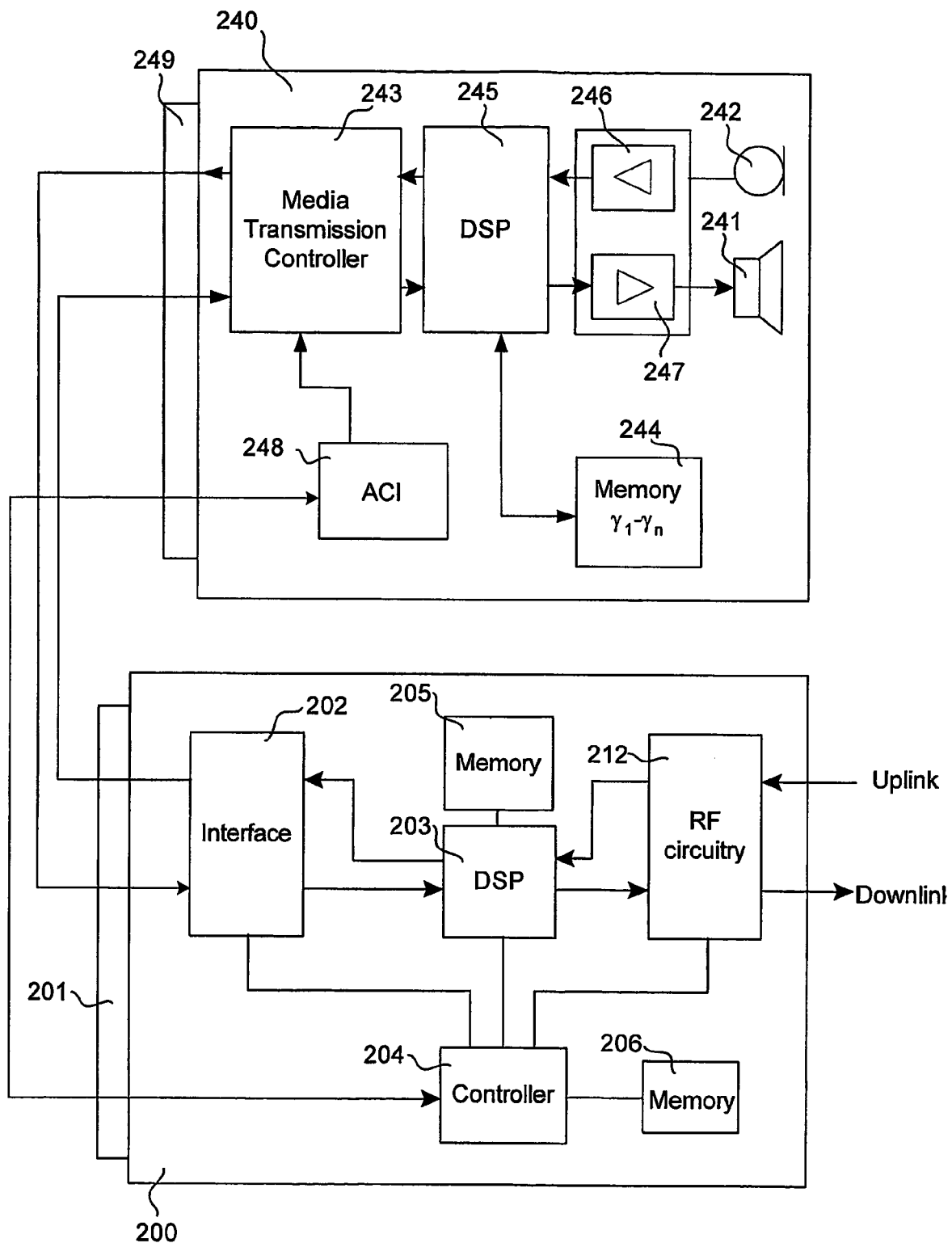
FIG. 2 is a schematic block diagram illustrating the mobile terminal and the accessory device in FIG. 1.

FIG. 2 illustrates a first embodiment of the present invention. A microphone 242 is arranged in, or at least connected to, the hands-free unit 240 in order to pick up sound from the user of the hands-free unit 240 and convert it into electrical signals. It is appreciated that the microphone 242 may be external to the hands-free, i.e. in case the hands-free is an integral part of a car, the microphone may be mounted at a location in the compartment of the car where the sound pickup from the user is optimal. The microphone 242 is connected to an amplifier 246 in order to adjust the signal level from the microphone 242 so as to optimize the signal-to-noise ratio of the received audio information. The amplified analogue audio signal is then transferred to a DSP 245 via an A/D converter (not shown) which converter may be integrated with the DSP 245 or implemented as a separate circuit. As will be disclosed below, the DSP performs the desired processing of the A/D converted analogue signals. The processed audio data is then transferred to a controller 243 which interacts with the mobile terminal 200 in order to transfer media data back and forth between the mobile terminal 200 and the hands-free unit 240. The controller 243 preferably comprises electric circuits for protecting the rest of the electric circuitry in the hands-free against electrostatic discharges, and may also comprise a transducer for converting the electrical signals from the DSP 245 into light signals or electromagnetic signals so as to provide wireless transmission of data between the hands-free unit 240 and the mobile terminal 200. It is appreciated that the controller 243 may transfer audio data back and forth between the mobile terminal 200 and hands-free unit 240 in digital form, or may comprise a D/A converter in order to provide the mobile terminal with analog signals. The controller 243 also provides the DSP 245 in the hands-free unit 240 with audio data received from the mobile terminal 240, which are then transferred to a D/A converter (not shown). The D/A converter may also be integrated in the DSP 245 or provided as a separate circuit. The DSP 245 is also connected to a second amplifier 247 which amplifies signals received by the hands-free unit 240 from the mobile terminal 200. The amplified signals are then fed to a loudspeaker 241 which is mounted in, or at least connected to, the hands-free unit 240. In case the hands-free unit 240 is an integral part of a car comprising a sound system, the hands-free unit 240 may use the available loudspeakers in the car for reproducing the audio data to the user of the hands-free unit.

The hands-free unit 240 preferably comprises an accessory control interface (ACI) 248 for controlling the interaction between the hands-free unit 240 and the mobile terminal 200. A memory 244 is connected to the DSP 245 for storing parameter values related to the function of the accessory device 240, i.e. in case the accessory device is a hands-free unit 240, the parameter values are preferably FIR-filter coefficients for an echo canceling system or a frequency equalizing system as will be disclosed in more detail below, or the coefficients may be still image or video processing parameters in case the accessory device has still imaging capabilities or video recording capabilities.

A connector 249 is arranged on the housing of the hands-free unit 240 for connecting the hands-free unit 240 to a corresponding connector 201 on the mobile terminal 200. It is noted that the connectors 201, 249 may couple the hands-free unit 240 to the mobile terminal 200 either by means of direct galvanic contact or by means of light (e.g. IR) or radio waves (e.g. Bluetooth). Consequently, the word "coupling" in this context implies any means for establishing a communication link between the mobile terminal 200 and the hands-free unit 240, so that data in any form, i.e. commands, audio data, still image data or video data, may be transferred between the mobile terminal 200 and the hands-free unit 240. In a preferred embodiment the hand-free unit 240 is able to transfer and receive analog audio data, i.e. an interface 202 in the mobile terminal 200 is arranged with A/D and D/A converters for transforming the analog audio data from the hands-free unit 240 into a format suitable for processing in a DSP 203. However, as indicated above, the hands-free unit 240 may be adapted to transfer digital data, in which case the interface 202 does not have to A/D convert the received signals.

The ACI 248 in the hands-free unit 240 is preferably connected to a controller 204 in the mobile terminal 200 so as to make it possible to transfer a message to the controller 204 in the mobile terminal 200, said message comprising a specification of some or all media processing capabilities achievable by using the DSP 245. The message may also comprise pre-stored parameter values retrieved from the memory 244 in the hands-free unit 240. The DSP 203 in the mobile terminal 200 normally executing an echo-canceling algorithm on the audio data received from the hands-free unit 240 may then delegate the desired processing to the DSP 245 in the hands-free unit 240 based on the message received from the hands-free unit 240 or may, in case the message also includes pre-stored parameter values, execute the echo-canceling algorithm itself based on these parameter values.

Additionally, the ACI 248 in the hands-free unit 240 may instruct the controller 204 in the mobile terminal to switch off specific media processing functions in the DSP 203 in the mobile terminal 200, which functions are instead provided by the DSP 245 in the hands-free unit 240. The overall performance of the system is hence optimized, since the hands-free unit 240 may be specifically adapted to the environment in which it is to be used. The demands for high-processing capabilities in the mobile terminal 200 are at the same time significantly reduced, since the media processing is performed in the hands-free unit 240.

In case the DSP 203 in the mobile terminal still is to perform some media processing, a memory 205 connected to the DSP 203 is used for temporary storage of the parameter values as well as storage of the program code for the echo-canceling algorithm e.g. In addition to or as an alternative to the echo-canceling algorithm, the DSP 203 in the mobile terminal or the DSP 245 in the hands-free unit may execute a frequency equalizing algorithm so as to compensate for frequency distortion caused by the environment in the compartment of the car.

A second memory 206 in the mobile terminal 200 is connected to the controller 204 and stores the control program executed by the controller 204 for providing the necessary services to the user (i.e. the operating system and additional applications such as an address book, wireless application protocol (WAP) services, games, etc). The DSP 203 is further connected to RF-circuitry 212 for communication with other units as illustrated in FIG. 1.

Figure 3:
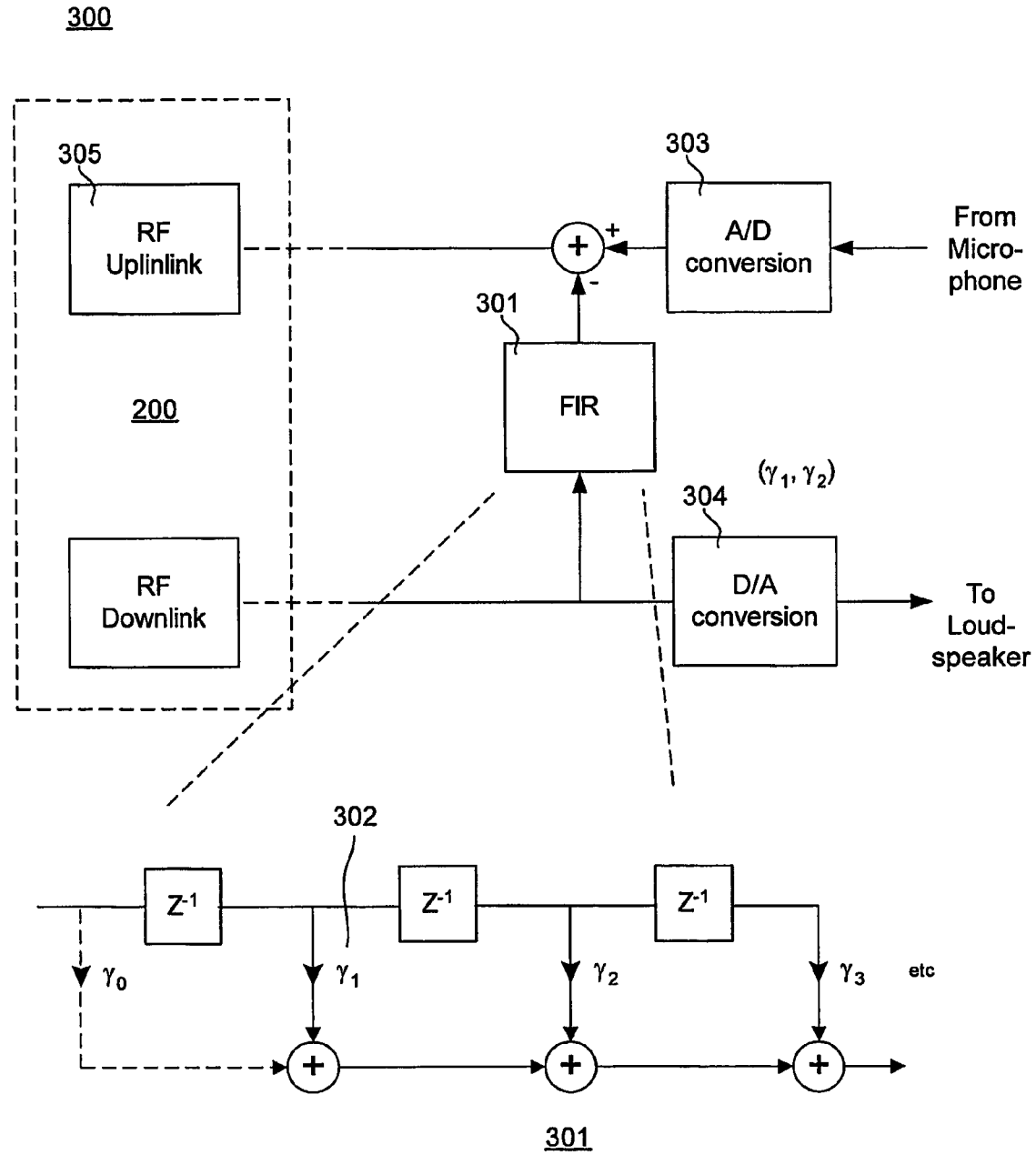
FIG. 3 is a schematic diagram of an echo canceling structure according to the present invention.

FIG. 3 is a more detailed view of an echo-canceling system 300 according to a preferred embodiment of the present invention. The FIR-filter structure 301 with its associated parameter values 302 is preferably implemented in software by the DSP 245 and its associated memory 244 shown in FIG. 2. The FIR-filter structure 301 may however be implemented in hardware, such as an application specific integrated circuit (ASIC) or a field-programmable gate array (FPGA), without deviating from the scope of the invention. The microphone 242 in the hands-free unit 240 will pick up all sounds in the compartment of the car, including the unwanted feedback from the loudspeaker 241 in the hands-free unit 240. The sound from the loudspeaker 241 reaches the microphone after traveling in many different paths, i.e. directly from the loudspeaker 241 and via reflections in different surfaces in the compartment of the car. As mentioned above, the signal from the microphone 242 is received in the DSP 245 in the hands-free unit and is converted from an analog signal to a corresponding digital signal in the analog-to-digital converter 303 so as to make it possible to use the DSP 245 for performing the required signal processing. The audio signal received from other terminals when performing a telephone call and which signal is received from the mobile terminal 200 is split into two paths where one path leads to the FIR-filter structure 301 and the other path leads to a digital-to-analog converter 304 for providing an analog signal to the loudspeaker 241.

The function of the FIR-filter 301 is to represent a model of the different paths over which the sound may travel in the compartment. In the well-known FIR-filter structure 301, thoroughly described in e.g. "Digital Signal Processing" by John G. Proakis et. al., Prentice Hall International, 1996, ISBN 0133943389, the signal after each delay is multiplied by a parameter value $\gamma_1$-$\gamma_n$, and is then added to the other delayed and weighted signals so as to form a filtered output signal. By carefully selecting the parameter values 302 for each branch in the FIR-filter structure 301, the output signal from the filter will be an exact copy of the signal from the loudspeaker 241 including all reflections mentioned above. The filtered signal may then be subtracted from the composite audio signal provided by the microphone 242 via the A/D converter 303 and hence after the summation point 305 produce a signal that corresponds to the voice of the user of the hands-free unit 240. The signal may then be transferred to the RF-circuitry 305 for transmission to other users of the networks in FIG. 1.

Figure 4:
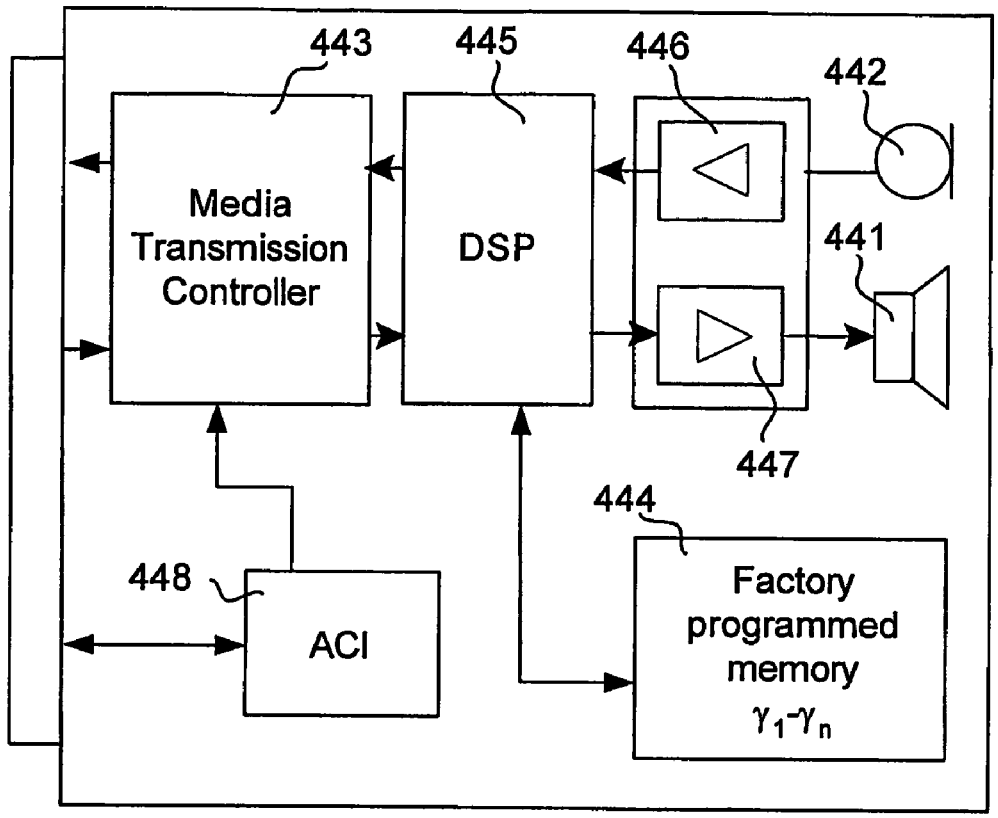
FIG. 4 illustrates an accessory device according to a first embodiment of the present invention.

FIG. 4 illustrates in more detail a hands-free unit 440 according to a first embodiment of the present invention. The hands-free unit 440 in the figure corresponds to the hands-free unit 240 illustrated in FIG. 2, but it is emphasized in FIG. 4 that the memory 444 comprises pre-stored parameter values that are derived under well established conditions at a production facility. More specifically, the parameter values pre-stored in the memory 444 of the hands-free unit 440 are uniquely derived for a specific car model and its associated compartment. By establishing the parameter values 302 for the FIR-filter structure 301 in a test facility using the specific car model in which the hands-free 440 is to be placed, it is possible to control the environment surrounding the car. It is hence possible to control all interfering noise sources that otherwise would produce less accurate parameter values 302. When establishing the parameter values 302 for the various algorithms that are to be executed by the DSP 445, it is possible to customize the environment in the compartment so as to provide parameter values 302 which gives the best performance of the algorithm. The performance of the echo-canceling algorithm or the frequency equalizing algorithm will hence be significantly improved compared to when the user establishes the parameter values by him self the first time he uses the hands-free unit 440. Additionally, by using pre-stored parameter values 302, the mobile terminal 200 does not need to exhibit high processing capabilities and does not need to calculate the parameter values 302 in an initial session and then transfer them to the hands-free unit 440. Moreover, by executing tailor-made algorithms in the DSP 445 in the hands-free unit 440 and signaling to the DSP 203 in the mobile terminal 200 via the ACI 448 to disable its corresponding, more general algorithms it is possible to improve the overall media processing performance of the mobile terminal/hands-free unit system. More specifically, as mentioned above, the algorithms executed in the hands-free unit 440 may be specifically developed for the hands-free unit 440 and the environment in which it is to be located. The complexity of the mobile terminal 200 may hence be reduced and the computational power of the mobile terminal 200 may be reserved for other purposes.

Figure 5:
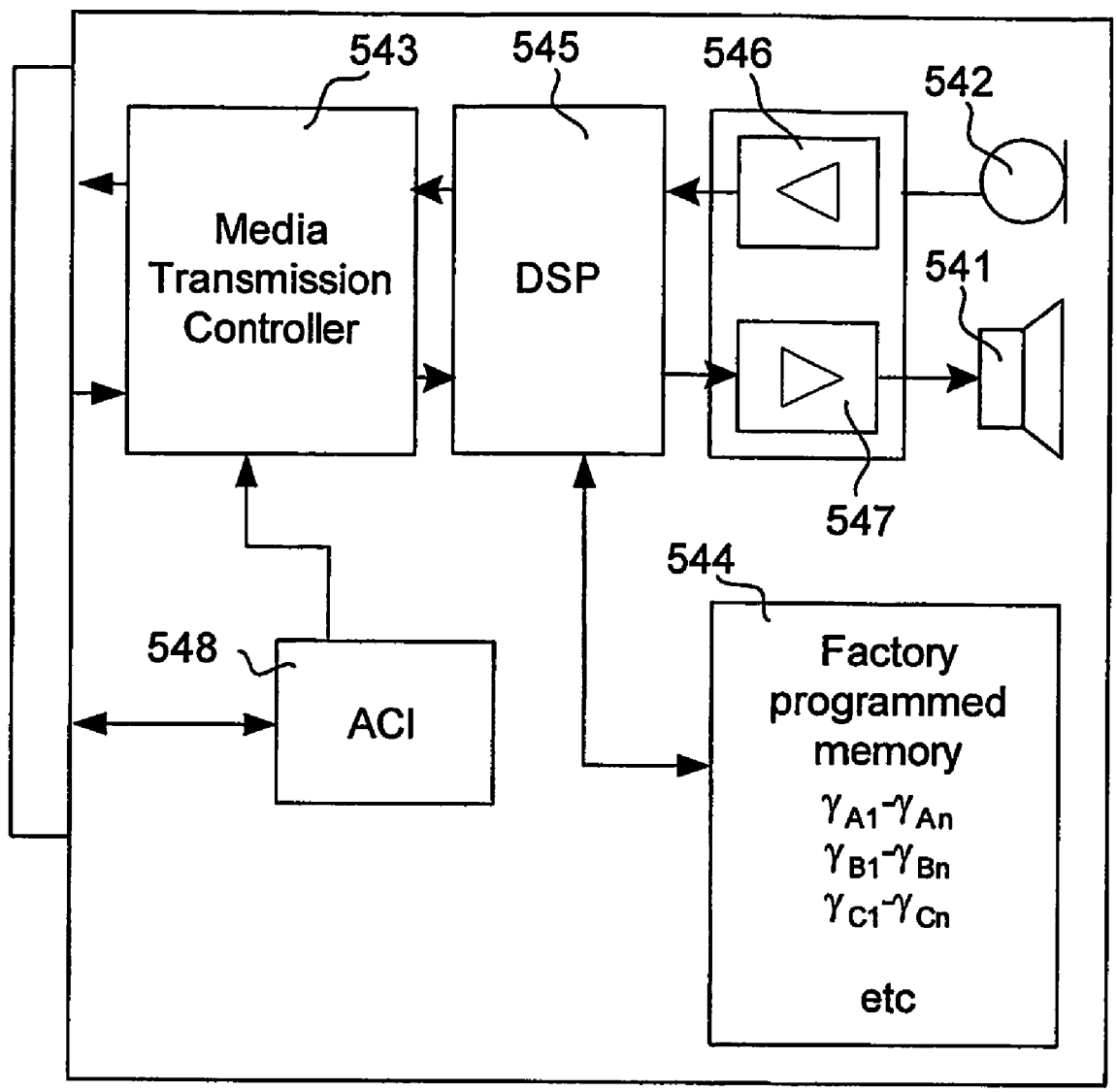
FIG. 5 illustrates an accessory device according to a second embodiment of the present invention.

FIG. 5 illustrates a second embodiment of a hands-free unit 540 according the present invention. In this embodiment the DSP 545 receives audio data from the amplifier 546 indicating the sound level and sound characteristics in the compartment of the car. As mentioned above, the audio data is A/D-converted before received in the DSP 545. The DSP 545 may then automatically select pre-determined parameter values 302 for the desired algorithm to perform based on a selective algorithm so as to improve the overall sound quality of the hands-free unit 540 and the mobile terminal 200. The DSP 545 continuously monitors the sound characteristics in the compartment and use this information in selecting the best suited set of parameter values 302. Various tests of the car under different operating conditions provide a base for a selection algorithm implemented in the DSP 545 for selecting the parameter values 302 to use, which parameter values 302 will give the best improvement in sound quality, i.e. the DSP 545 uses "audio fingerprints" from different situations in making the selection of the set of parameter values 302. As with the previous embodiment, no heavy demands will be put on the mobile terminal 200 as regards processing capabilities and the need to calculate the parameter values 302.

Figure 6:
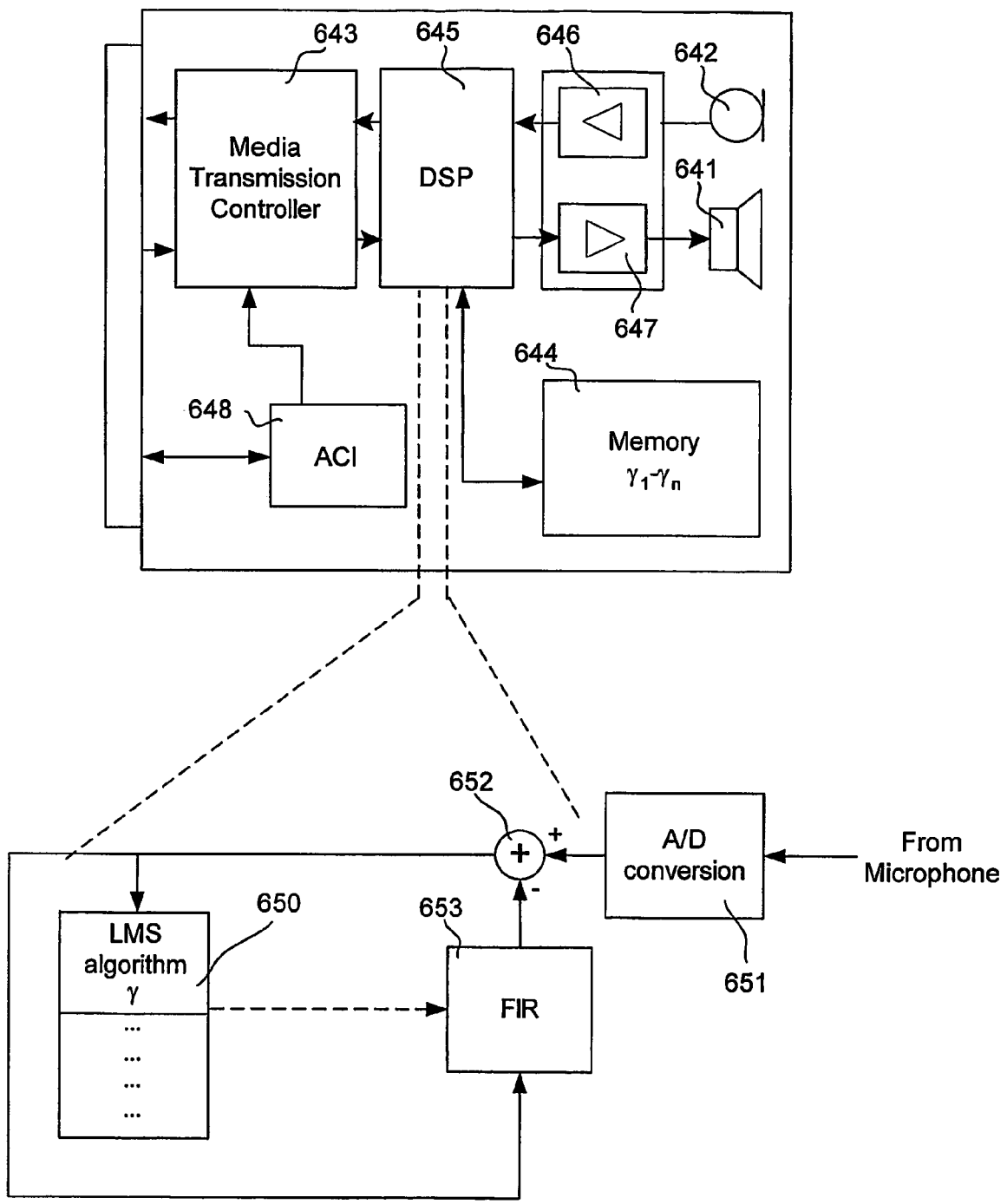
FIG. 6 illustrates an accessory device according to a third embodiment of the present invention.

FIG. 6 illustrates a third embodiment of a hands-free unit 640 according to the present invention. In the third embodiment, the FIR-structure in FIG. 3 is supplemented with a least mean square (LMS) algorithm 650 known per se which preferably is implemented in the DSP 645 as shown in the figure. The audio data received from the microphone 642 is A/D-converted 651 and provided to a summing function 652 where the output from the FIR-structure 653 is subtracted from the output from A/D-converter 651. The result from the subtraction is fed to the LMS algorithm 650 which adjusts the parameter values $\gamma$ of the FIR-filter structure 653 in order to minimize the echoes arising from the small compartment of the car. The optimized parameter values are then used by the DSP 645 in the accessory unit, or may be transferred to the DSP 203 in the mobile terminal 200, in order to provide an optimized echo-canceling function in the mobile terminal 200/accessory unit system. The DSP 645 and the LMS algorithm 650 continuously monitors the echoes in the compartment so as to automatically provide optimized parameter values to the algorithm performed by the DSP 645 when the conditions in the compartment are changed due to e.g. the inclusion of an additional passenger in the compartment. It is appreciated that the LMS algorithm 650 may be changed to or supplemented with any other suitable algorithm for performing an automatic optimization of the parameter values used for audio enhancements such as frequency equalization.

The DSP 645 may use time gaps in the audio data flow, e.g. when the amplitude in the audio channels are low, to update the parameter values. The user of the hands-free unit 640 will hence take no notice of the small silent period arising from the parameter update.

Consequently, the user of the hands-free unit 640 according to the third embodiment of the present invention will always be provided with an optimized set of parameter values regardless of changes in the environment in which the user is residing due to e.g. if a person leaves or enters the compartment of the car. Since the ACI 648 may instruct the DSP 203 in the mobile terminal to disable specific functions superiorly performed in the hands-free unit, the overall performance of the system will be increased.

Figure 7:
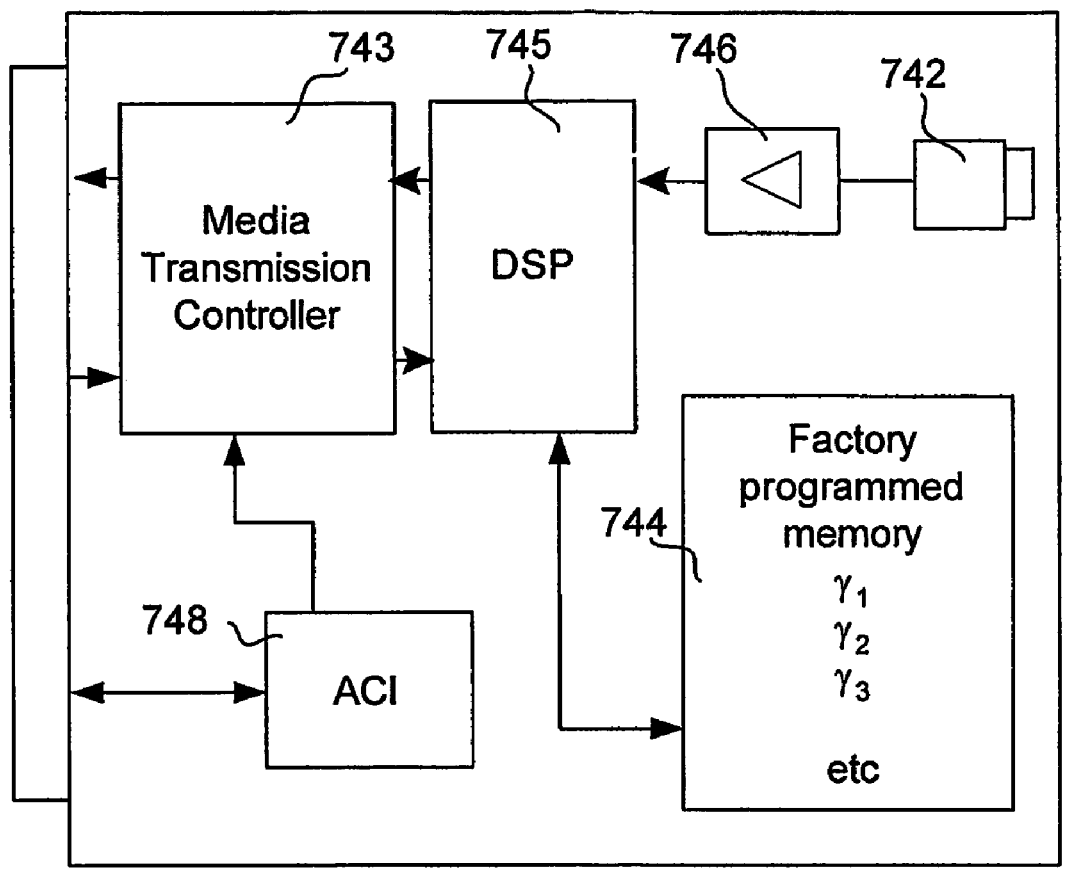
FIG. 7 illustrates an accessory device according to a fourth embodiment of the present invention.

In the embodiments disclosed above the accessory device is embodied as a hands-free unit. It is however appreciated that the accessory device as well may comprise a video camera 742 or a still image camera 742 as shown in a fourth embodiment in FIG. 7. A DSP 745 is connected to a memory 744 comprising parameter values $\gamma_1$-$\gamma_n$ which is used for controlling the contrast, luminance, or saturation of the image signal. The process of transferring the parameter values from the memory 744 corresponds to the process of transferring the audio-related parameter values disclosed above. It is hence possible to provide optimized parameter values for any specific application which the mobile terminal 200 and the accessory device might be used for.

While the present invention has been particularly shown and described with reference to specific embodiments thereof, it will be understood by those skilled in the art that various changes in form and detail may be made thereto, and that other embodiments of the present invention beyond embodiments specifically described herein may be made or practiced without departing from the spirit and scope of the present invention as limited solely by the appended claims.

The invention claimed is:

1. An apparatus comprising:
    media data processing circuitry configured to perform at least a first data processing algorithm on media data in the apparatus; and
    accessory interface circuitry configured to provide a message for transfer to a mobile telecommunications terminal, said message comprising a specification identifying the at least a first data processing algorithm performable by the media data processing circuitry included in the apparatus,
    wherein the media data processing circuitry is configured, following disablement of further media data processing circuitry configured to perform at least a second data processing algorithm on media data in the mobile telecommunications terminal, to perform the at least a first data processing algorithm on first media data in place of the performance of the at least a second data processing algorithm on the first media data in the mobile telecommunications terminal, and
    wherein the at least a first data processing algorithm and the at least a second data processing algorithm are echo-canceling and/or frequency equalizing algorithms.

2. An apparatus according to claim 1, wherein the accessory interface circuitry is configured to receive a request, from the mobile telecommunications terminal, for a transfer of the message before transferring the message to the mobile communications terminal.

3. An apparatus according to claim 1, comprising media transferring circuitry configured to transfer the first media data from the apparatus to the mobile telecommunications terminal, following the performance of the at least a first data processing algorithm on the first media data.

4. An apparatus according to claim 3, wherein the media transferring circuitry is configured to transfer audio data, video data or image data.

5. The apparatus according to claim 1, wherein the media data processing circuitry is configured to perform the at least a first data processing algorithm on first media data in place of the performance of the at least a second data processing algorithm on the first media data in the mobile telecommunications terminal, following delegation of a processing task to the apparatus by the mobile telecommunications terminal.

6. The apparatus according to claim 1, wherein the media data is audio data and the at least a first data processing algorithm and the at least a second data processing algorithm are audio data processing algorithms.

7. A method comprising:
    providing a message for transfer from an apparatus to a mobile telecommunications terminal, the apparatus comprising media data processing circuitry configured to perform at least a first data processing algorithm on media data, the mobile telecommunications terminal comprising further media data processing circuitry configured to perform at least a second data processing algorithm on media data, and the message comprising a specification identifying the at least a first data processing algorithm performable by the media data processing circuitry; and
    following disablement of the further media data processing circuitry of the mobile telecommunications terminal, performing the at least a first data processing algorithm on first media data in the apparatus in place of the performance of the at least a second data processing algorithm on the first media data in the mobile telecommunications terminal, and
    wherein the at least a first data processing algorithm and the at least a second data processing algorithm are echo-canceling and/or frequency equalizing algorithms.

8. A method according to claim 7, further comprising receiving a request, from the mobile telecommunications terminal, for a transfer of the message before transferring the message to the mobile communications terminal.

9. A method according to claim 7, further comprising transferring the first media data, following the performance of the at least a first data processing algorithm on the first media data, to the mobile telecommunications terminal.

10. A method according to claim 9, wherein the transferred first media data is audio data, video data or image data.

11. The method according to claim 7, further comprising: transferring the message from the apparatus to the mobile telecommunications terminal and, following transfer of the message, disabling the further media data processing circuitry of the mobile communications terminal.

12. The method according to claim 7, wherein the at least a first data processing algorithm is performed on the first media data in place of the performance of the at least a second data processing algorithm on the first media data in the mobile telecommunications terminal, following delegation of a processing task to the apparatus by the mobile telecommunications terminal.

13. A memory storing computer program instructions that, when executed by processing circuitry of an apparatus, cause the apparatus to perform:
    providing a message for transfer from the apparatus to a mobile telecommunications terminal, the apparatus comprising media data processing circuitry configured to perform at least a first data processing algorithm on media data, the mobile telecommunications terminal comprising further media data processing circuitry configured to perform at least a second data processing algorithm on media data, and the message comprising a specification identifying the at least a first data processing algorithm performable by the media data processing circuitry; and following disablement of the further media data processing circuitry of the mobile telecommunications terminal, performing the at least a first data processing algorithm on first media data in the apparatus in place of the performance of the at least a second data processing algorithm on the first media data in the mobile telecommunications terminal, and wherein the at least a first data processing algorithm and the at least a second data processing algorithm are echo-canceling and/or frequency equalizing algorithms.

14. The memory according to claim 13, wherein the instructions further cause the apparatus to perform:

transferring the first media data from the apparatus to the mobile telecommunications terminal, following the performance of the at least a first data processing algorithm on the first media data.

* * * * *